(12) United States Patent
Willis, III (10) Patent No.: US 11,778,496 B2
(45) Date of Patent: Oct. 3, 2023

(54) IN-SERVICE FADE MARGIN MEASUREMENT

(71) Applicant: AT&T Intellectual Property I, L.P., Atlanta, GA (US)

(72) Inventor: Thomas M. Willis, III, Tinton Falls, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 191 days.

(21) Appl. No.: 17/391,653

(22) Filed: Aug. 2, 2021

(65) Prior Publication Data

US 2023/0032187 A1 Feb. 2, 2023

(51) Int. Cl.
*H04W 24/08* (2009.01)
*H04L 1/00* (2006.01)

(52) U.S. Cl.
CPC ............ *H04W 24/08* (2013.01); *H04L 1/004* (2013.01)

(58) Field of Classification Search
None
See application file for complete search history.

(56) References Cited

U.S. PATENT DOCUMENTS 6,741,866 B1 * 5/2004 Gustavsson ............... H04L 1/24
455/504
2021/0226727 A1 * 7/2021 Gleason ............. H04L 43/0823

* cited by examiner

Primary Examiner — Saad Khawar
(74) Attorney, Agent, or Firm — GUNTIN & GUST, PLC; Robert Gingher (57) ABSTRACT

Methods may include alerting fixed service microwave operators that their network has been compromised due to interference, before their service is necessarily impacted. In an example, method may include receiving instructions to test fade margin for a wireless communication link associated with a receiver radio, wherein the wireless communication link is passing live traffic; testing the fade margin while the wireless communication link is passing the live traffic; receiving error information, wherein the error information is based on an error correction mechanism for the wireless communication link; based on the error information, determining that a threshold number of errors has been reached; and sending an alert based on the threshold number of errors.

20 Claims, 5 Drawing Sheets

IN-SERVICE FADE MARGIN MEASUREMENT

BACKGROUND

With the introduction of unlicensed devices in the 6 GHz band, interference from such devices can impair the fade margin on an incumbent fixed service terrestrial point-to-point microwave link. If this happens, the fixed service link performance may not meet the expectations the link has been designed to. The outage time and number of degraded seconds on that link could exceed the expected long term averages by a large factor. This can be quite problematic as often these fixed service links carry critical traffic and are expected to perform with very high availability. Expected availabilities of 99.999% are not uncommon for these links.

This background information is provided to reveal information believed by the applicant to be of possible relevance. No admission is necessarily intended, nor should be construed, that any of the preceding information constitutes prior art.

SUMMARY

A system is described whereby there is an ability to perform periodic fade margin measurements on a fixed service communication link carrying live traffic without significantly affecting the live traffic.

In an example, an apparatus may include a processor and a memory coupled with the processor that effectuates operations. The operations may include receiving instructions to test fade margin for a wireless communication link associated with a receiver radio, wherein the wireless communication link is passing live traffic; testing the fade margin when the wireless communication link is passing the live traffic; receiving error information, wherein the error information is based on an error correction mechanism for the wireless communication link; based on the error information, determining that a threshold number of errors has been reached; and sending an alert based on the threshold number of errors.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale.

DETAILED DESCRIPTION

In a first method, a fixed service operator may detect if the fade margin on their wireless communication link is degraded by taking a link out of service and testing. This method requires the link be taken out of service and a known test signal sent across the link so that errors at the far side can be detected. Then the transmit power can be slowly reduced until errors are detected and the received signal level at this point measured. The received signal when errors begin in the absence of interference is a known parameter of the fixed service radio published by its vendor. This can be compared to the measured value. If the measured value is greater than that expected without interference, this indicates that interference is present, and the fade margin has been degraded by this difference.

In a second method, a link may be continuously monitored so that its performance during any weather related multipath fading event recorded. In the event of a fading event that results in detected errors on live traffic, the received signal level can be measured when errors occur. However, since multipath fading events may be random and may involve large rapid changes in received signal levels, it may be challenging to get an accurate received signal level for the onset of errors.

Ideally many measurements should be made to have a reasonable expectation that intermittent interference has not been missed. Consequently, neither technique is particularly convenient for the operator. In the first method, customer traffic must be interrupted to perform the test. As the fixed service links often carry critical traffic, repeatedly bringing them off-line to perform a fade margin test is not preferred. In the second method, the link may need to be monitored for a very long time to have experienced a number of weather-related fading events, assuming good received signal level measurements during these events were possible, which will not always be the case. Furthermore this method is only reactive as the operator will only know to look for an interference problem after a long period of degraded performance. A method that can identify interference situations without any impacts to the customer traffic is needed, so these can be investigated and remediated before degraded performance is experienced.

Figure 1:
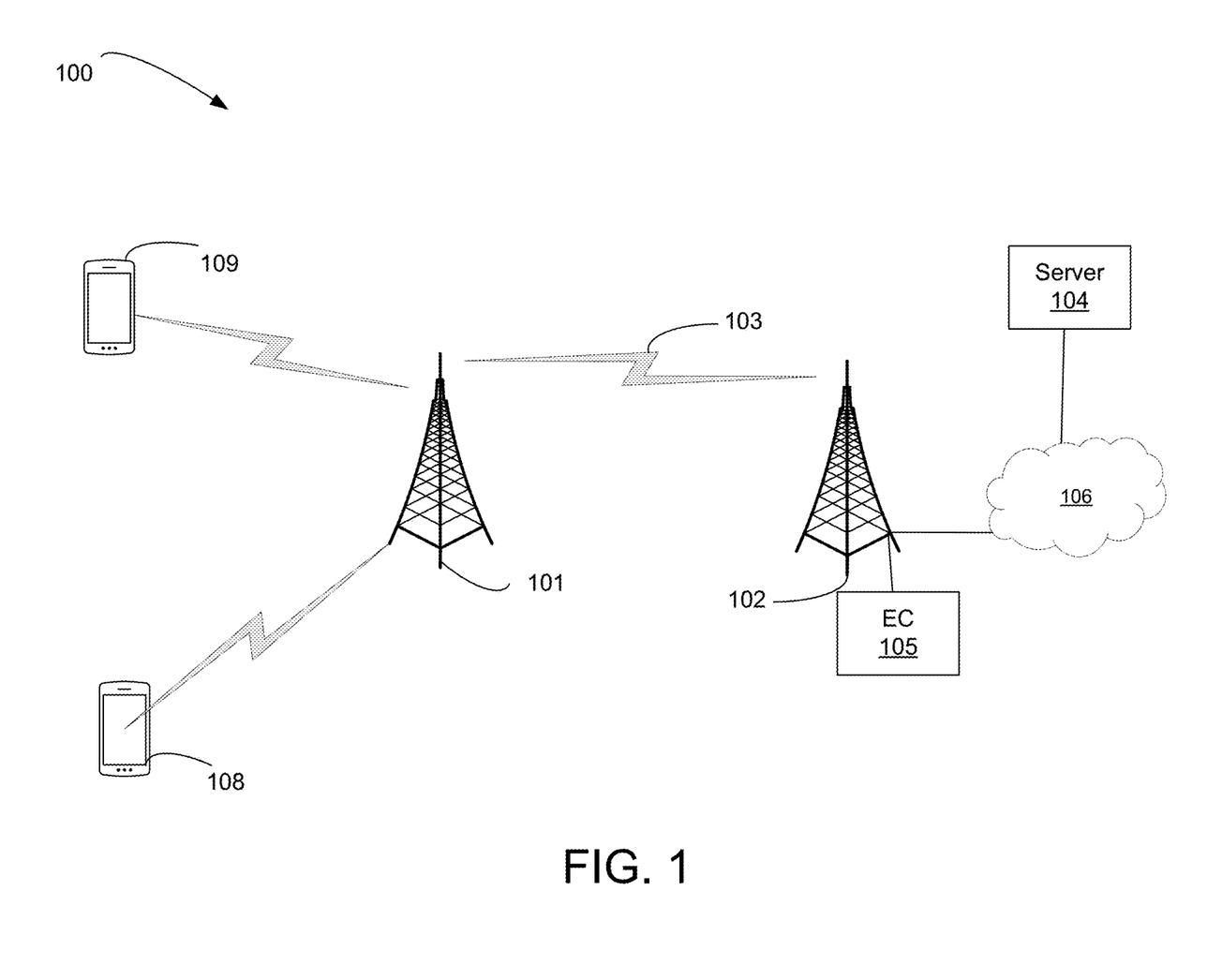
FIG. 1 illustrates an exemplary system for in-service fade margin measurement, among other things.

FIG. 1 illustrates an exemplary system for in-service fade margin measurement, among other things. System 100 may include multiple wired communication devices or wireless communication devices. System 100 may include end user device 108, end user device 109, base station and radio 101, radio 102, or server 104. The devices of system 100 may be communicatively connected with each other. As shown, network 106 may help to communicatively connect server 104 with radio 102 and error correction mechanism 105 (e.g., forward error correction), which may be performed within radio 102. Radio 101 may be communicatively connected with radio 102 via wireless communication link 103 (e.g., a fixed service radio link). It is contemplated that one or more devices of system 100 may be physical devices or virtual devices.

The disclosed subject matter may alert fixed service microwave operators that their network has been compromised due to interference, before their service is necessarily impacted. The operators have the opportunity to take proactive steps to remediate the interference before eventual service affecting events. This capability may be of particular value in the 6 GHz band where unlicensed devices have just recently been permitted under FCC rules. The disclosed subject matter may allow for the point-to-point microwave service operators to look for unlicensed interference based on measurements before it degrades service. This would allow the possible correction of these interference problems before the network performance is compromised. As the licensed microwave point-to-point community has not had to worry about unlicensed interference previously, the conventional radios in the field are not well equipped to do this now.

An in-service fade margin test may be conducted on live traffic of wireless communication link 103. Live traffic may be considered traffic that traverses the link that is not primarily used for testing, such as customer traffic. In an example, radio 101 or radio 102 may correct errors up to some error threshold using its EC mechanism 105. Error correction (EC) mechanism 105, which may be present on radio 102 (also error correction may be in use in radio 101). In example, the error correction mechanism 105 may be forward error correction that is integrated into digital microwave fixed service radios. When the input error rate while using EC mechanism 105 reaches the error threshold, the traffic payload may actual experience errors that affect the performance of wireless communication link 103. The performance may include throughput, rate of packet drops, or latency, among other things. Radio 102 (e.g., a radio receiver) may report: 1) when it is required to fix input errors and can do so; or 2) if errors are too severe (e.g., beyond the error threshold) and it is unable to correct them in a way that would be within a performance threshold of wireless communication link 103. The transmit power of the radio at radio 101 may be slowly decreased until the receiver (e.g., radio 102/EC mechanism 105) reports it is correcting errors arriving at some rate sufficiently below the error rate threshold where error correction is not possible (e.g., degraded performance). At this point the received signal level may be measured at the receiver (e.g., radio 102) to obtain a first value. This first value may be compared against an expected received signal level (e.g., a second value) with the same input error rate to the EC (e.g., FEC) in the absence of interference. An indication of a difference between these two values may indicate the presence of interference and the amount of the difference in the values is the fade margin degradation.

Figure 2:
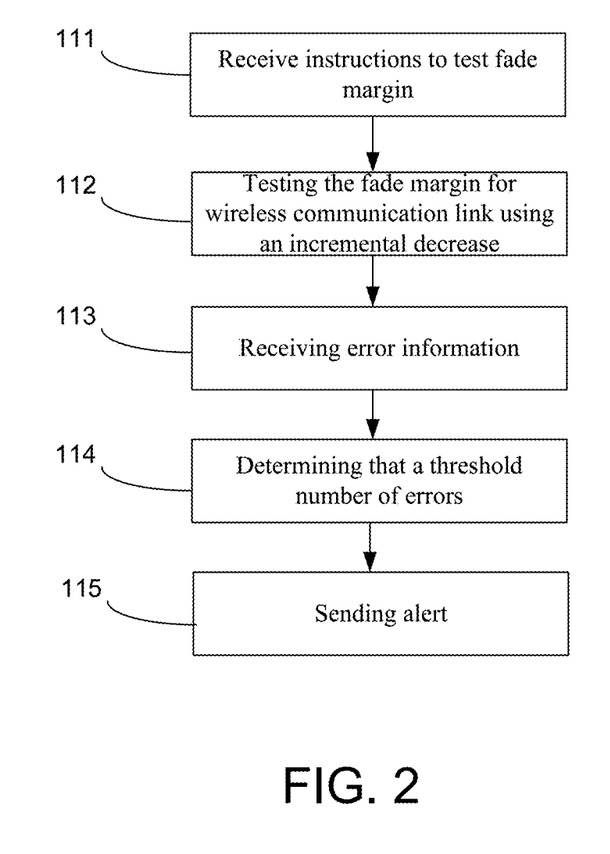
FIG. 2 illustrates an example method for in-service fade margin testing.

FIG. 2 illustrates an example method for in-service fade margin testing. At step 111, receiving instructions to test fade margin for wireless communication link 101. At step 112, testing the fade margin for wireless communication link 101 using an incremental decrease in transmit signal from radio 101 to radio 102. At step 113, receiving error information for wireless communication link 103 during the testing period for the fade margin. The error information may be errors that occur at an error rate before error correction, in which, for example, forward error correction is performed by radio 102. At step 114, based on the error information of step 113, determining that a threshold number of errors occurred on wireless communication link 103. At step 115, in response to the threshold number of errors occurring, sending an alert (e.g., a message). The alert may include a fade margin degradation value or an indication to cease the in-service fade margin testing, among other things.

Figure 3:
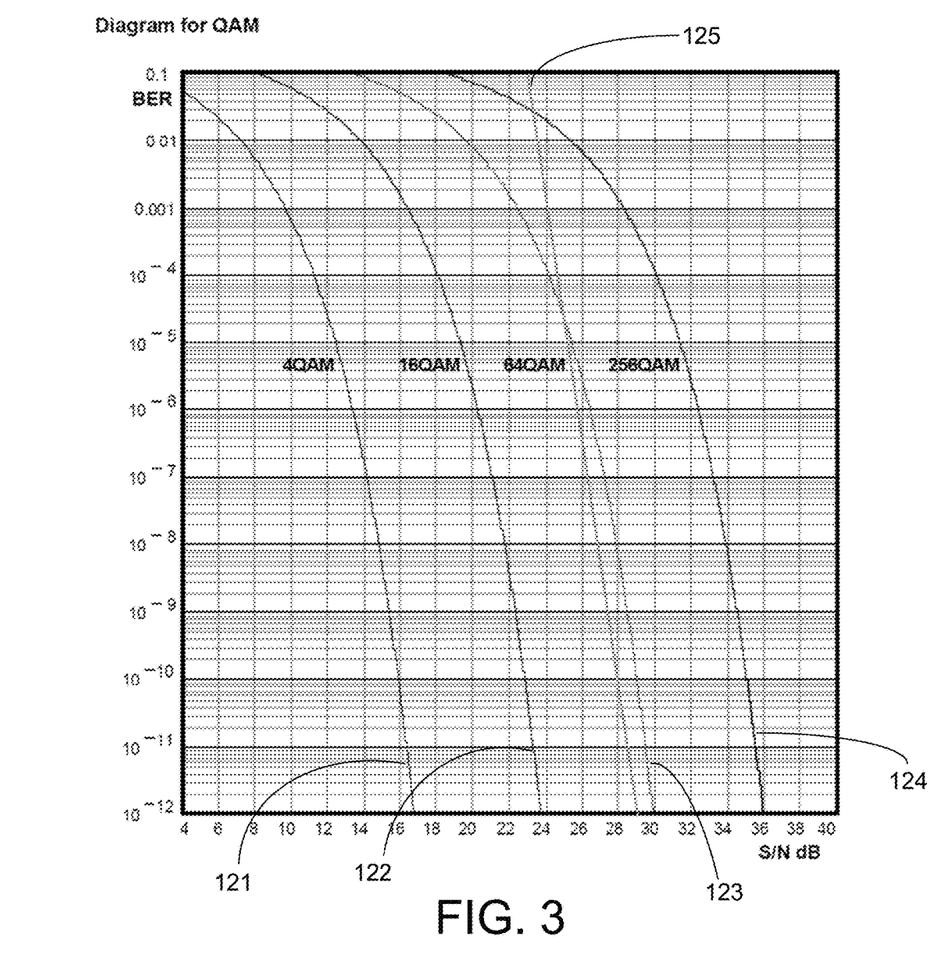
FIG. 3 illustrates an exemplary chart that may be utilized with in-service fade margin testing.

An example scenario is described below. FIG. 3 illustrates an exemplary chart that shows a Bit Error Rate (BER) versus Signal to Noise (S/N) ratio for a radio receiver. Curve 121, curve 122, curve 123 and curve 124 show the BER without FEC for different modulations, 4 QAM, 16 QAM, 64 QAM and 256 QAM, respectively. The line 125 shows a possible BER versus S/N for 256 QAM after FEC. During a fade margin test, if the radio transmit power is reduced until the 256 QAM BER before FEC is $10^{-5}$, the S/N ratio should be about 31 dB. A BER of $10^{-5}$ before the FEC can be easily measured by radio 102 (the receiver), so this operating point may be obtained by radio 102 sending a message back to radio 101 (the transmitter). The message may provide an indication for when radio 101 should stop reducing its power during the fade margin test. At this operating point the BER after FEC would essentially be zero, as line 125 is off the chart at an S/N of 31 dB. So, there would be no significant impact to the live traffic on wireless communication link 103.

Furthermore, the receive signal level at this operating point should be known from the characteristics of radio 102 in the absence of interference. If interference is present, the receive signal level at this operating point will be greater than the expected value. If such a difference exits, it is an estimate of the amount of fade margin degradation the radio link is suffering from interference. For example, if the expected BER is $10^{-5}$ before error correction when the received signal level is −65 dBm, but during the test the BER before correction hits $10^{-5}$ at a received signal level of −58 dBm, then interference is indicated. Furthermore, since the difference in these receive levels is 7 dB, the fade margin of this link has been degraded by 7 dB. Consequently, if there is a difference between the expected and measure receive signal levels at a predefined BER before correction, the radio monitoring system can take some action. This value can be logged in the performance data for the radio, informing the operator that interference was measured and how serious it was based on a rating, flag, or other indication. As the nature of the interference will likely be bursty and intermittent, collecting this data on a regular interval over time may paint a picture (e.g., graphical map representation) of the interference environment that wireless communication link 103 is operating within. If the analysis of the interference environment suggests that the long-term performance of wireless communication link 103 is unacceptable, steps may be taken to identify interference sources and rectify them. This may also involve FCC notification of the situation.

Using the disclosed in-service fade margin measurement tests may present a small risk to the performance of the fixed service radio link. For example, if a rapid fading event should occur while the test is being performed and the transmit power is below its nominal value, errors could be introduced on the link that otherwise would not have occurred. Although small, this risk may be further minimized by only performing these tests periodically during times unlikely to suffer a rapid fading event. For example, in-service fade margin measurement tests may be performed every two to four hours when significant fading is not expected. Determining when to perform the in-service fade margin measurement test may be made by server 104 or another device by analyzing historical fading activity received signal level measurements (e.g., historical fade margin degradation values, and corresponding transmit power and error rates) on wireless communication link 103. As multipath fading tends to follow a diurnal pattern, if fading exceeding perhaps 10 dB to 15 dB has occurred in some time interval at the same time of day in any of the previous 3 to 5 days, or such fading has been detected in the previous four to six hours, the normally scheduled fade margin test may be suspended. The parameters to use for this determination (e.g., time periods and fading levels) may be indicated by the radio vendor, or values for the parameters may be selected by the operator from ranges specified by the vendor. In another example, machine learning may be employed to schedule or control when tests are performed to minimize risk. Further, if the received signal level abruptly falls to a level that affects service during a fade margin test, the test may be aborted and the transmit power returned to its nominal value. In addition, this event may be logged by radio 102 so that adjustments to the fade activity estimation parameters may be considered.

Figure 4:
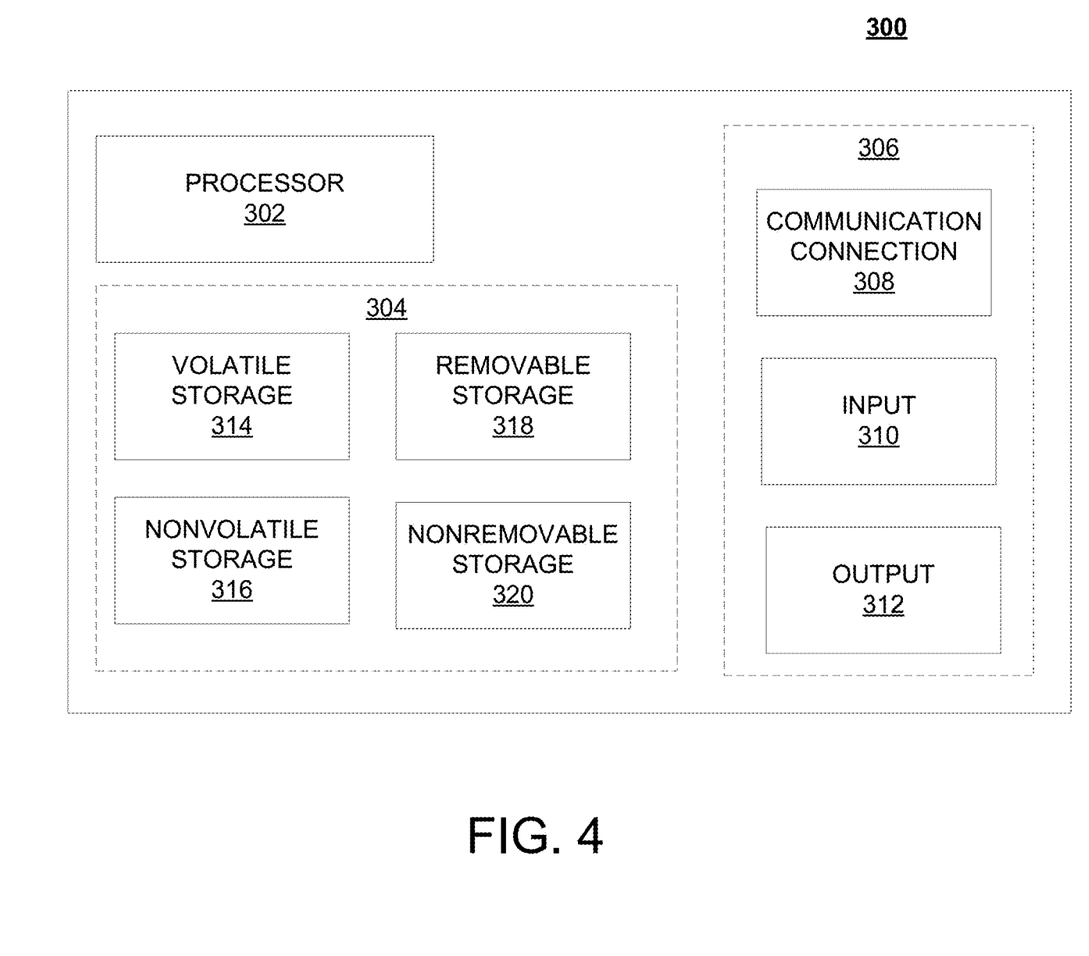
FIG. 4 illustrates a schematic of an exemplary network device.

FIG. 4 is a block diagram of network device 300 that may be connected to or comprise a component of system 100. Network device 300 may comprise hardware or a combination of hardware and software. The functionality to facilitate telecommunications via a telecommunications network may reside in one or combination of network devices 300. Network device 300 depicted in FIG. 4 may represent or perform functionality of an appropriate network device 300, or combination of network devices 300, such as, for example, a component or various components of a cellular broadcast system wireless network, a processor, a server, a gateway, a node, a mobile switching center (MSC), a short message service center (SMSC), an automatic location function server (ALFS), a gateway mobile location center (GMLC), a radio access network (RAN), a serving mobile location center (SMLC), or the like, or any appropriate combination thereof. It is emphasized that the block diagram depicted in FIG. 4 is exemplary and not intended to imply a limitation to a specific implementation or configuration. Thus, network device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Network device 300 may comprise a processor 302 and a memory 304 coupled to processor 302. Memory 304 may contain executable instructions that, when executed by processor 302, cause processor 302 to effectuate operations associated with mapping wireless signal strength.

In addition to processor 302 and memory 304, network device 300 may include an input/output system 306. Processor 302, memory 304, and input/output system 306 may be coupled together (coupling not shown in FIG. 4) to allow communications between them. Each portion of network device 300 may comprise circuitry for performing functions associated with each respective portion. Thus, each portion may comprise hardware, or a combination of hardware and software. Input/output system 306 may be capable of receiving or providing information from or to a communications device or other network entities configured for telecommunications. For example, input/output system 306 may include a wireless communications (e.g., 3G/4G/5G) card. Input/output system 306 may be capable of receiving or sending video information, audio information, control information, image information, data, or any combination thereof. Input/output system 306 may be capable of transferring information with network device 300. In various configurations, input/output system 306 may receive or provide information via any appropriate means, such as, for example, optical means (e.g., infrared), electromagnetic means (e.g., RF, Wi-Fi, Bluetooth®, ZigBee®), acoustic means (e.g., speaker, microphone, ultrasonic receiver, ultrasonic transmitter), or a combination thereof. In an example configuration, input/output system 306 may comprise a Wi-Fi finder, a two-way GPS chipset or equivalent, or the like, or a combination thereof.

Input/output system 306 of network device 300 also may contain a communication connection 308 that allows network device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with telecommunications, such as functions for processing broadcast messages, as described herein. For example, processor 302 may be capable of, in conjunction with any other portion of network device 300, determining a type of broadcast message and acting according to the broadcast message type or content, as described herein.

Memory 304 of network device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by network device 300. Memory 304 may comprise executable instructions that, when executed by processor 302, cause processor 302 to effectuate operations to map signal strengths in an area of interest.

Figure 5:
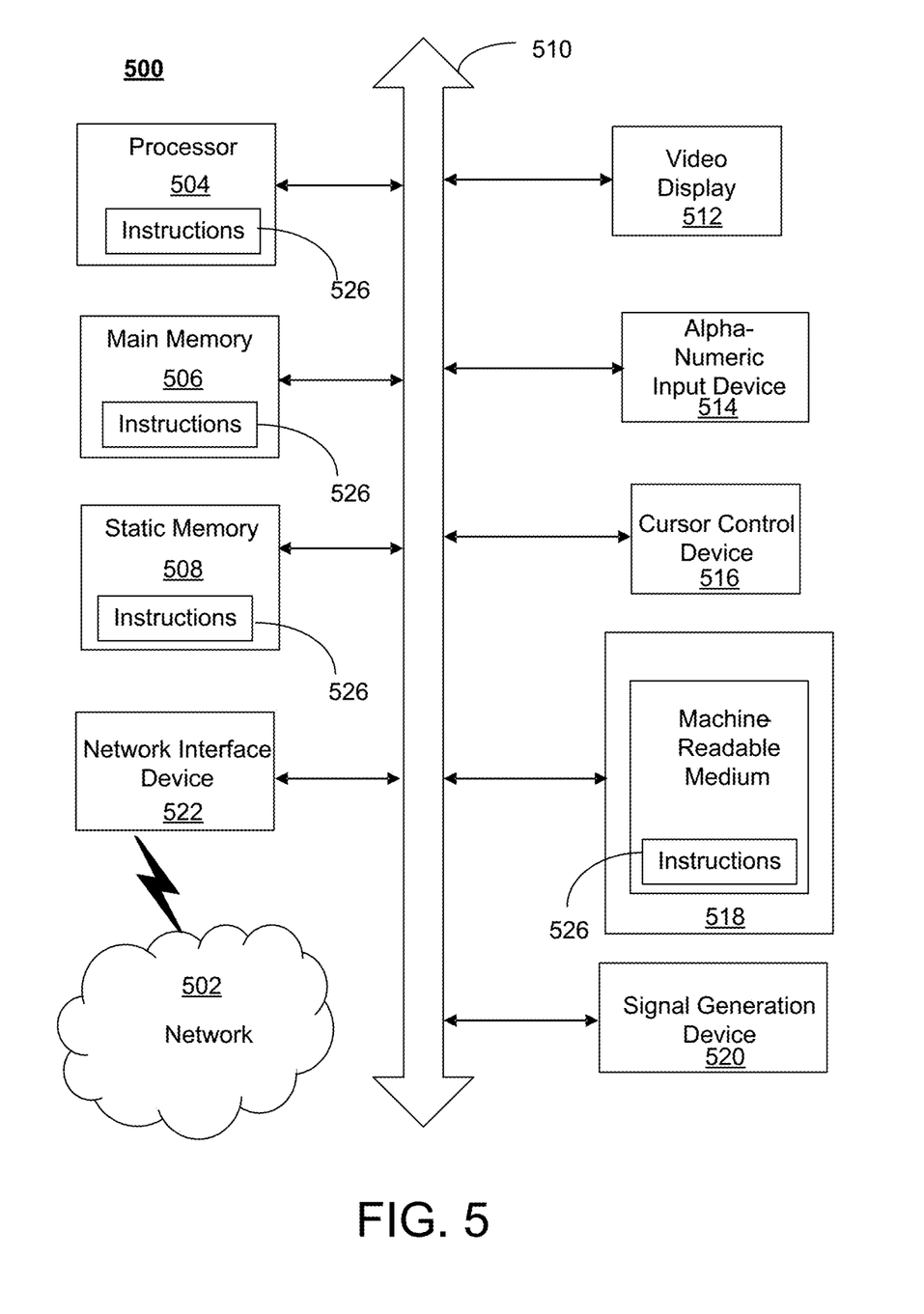
FIG. 5 illustrates an exemplary communication system that provides wireless telecommunication services over wireless communication networks.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as processor 302, mobile device 108, mobile device 109, server 104, radio 101, radio 102, and other devices of FIG. 1. In some examples, the machine may be connected (e.g., using a network 502) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

Computer system 500 may include a processor (or controller) 504 (e.g., a central processing unit (CPU)), a graphics processing unit (GPU, or both), a main memory 506 and a static memory 508, which communicate with each other via a bus 510. The computer system 500 may further include a display unit 512 (e.g., a liquid crystal display (LCD), a flat panel, or a solid state display). Computer system 500 may include an input device 514 (e.g., a keyboard), a cursor control device 516 (e.g., a mouse), a disk drive unit 518, a signal generation device 520 (e.g., a speaker or remote control) and a network interface device 522. In distributed environments, the examples described in the subject disclosure can be adapted to utilize multiple display units 512 controlled by two or more computer systems 500. In this configuration, presentations described by the subject disclosure may in part be shown in a first of display units 512, while the remaining portion is presented in a second of display units 512.

The disk drive unit 518 may include a tangible computer-readable storage medium on which is stored one or more sets of instructions (e.g., software 526) embodying any one or more of the methods or functions described herein, including those methods illustrated above. Instructions 526 may also reside, completely or at least partially, within main memory 506, static memory 508, or within processor 504 during execution thereof by the computer system 500. Main memory 506 and processor 504 also may constitute tangible computer-readable storage media.

As described herein, a telecommunications system may utilize a software defined network (SDN). SDN and a simple IP may be based, at least in part, on user equipment, that provide a wireless management and control framework that enables common wireless management and control, such as mobility management, radio resource management, QoS, load balancing, etc., across many wireless technologies, e.g. LTE, Wi-Fi, and future 5G access technologies; decoupling the mobility control from data planes to let them evolve and scale independently; reducing network state maintained in the network based on user equipment types to reduce network cost and allow massive scale; shortening cycle time and improving network upgradability; flexibility in creating end-to-end services based on types of user equipment and applications, thus improve customer experience; or improving user equipment power efficiency and battery life—especially for simple M2M devices—through enhanced wireless management.

While examples of a system in which in service fade margin measurement alerts can be processed and managed have been described in connection with various computing devices/processors, the underlying concepts may be applied to any computing device, processor, or system capable of facilitating a telecommunications system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, CD-ROMs, DVDs, hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for telecommunications. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language, and may be combined with hardware implementations.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as a client computer, or the like, the machine becomes a device for implementing telecommunications as described herein. When implemented on a general-purpose processor, the program code combines with the processor to provide a unique device that operates to invoke the functionality of a telecommunications system.

While the disclosed systems have been described in connection with the various examples of the various figures, it is to be understood that other similar implementations may be used or modifications and additions may be made to the described examples of a telecommunications system without deviating therefrom. For example, one skilled in the art will recognize that a telecommunications system as described in the instant application may apply to any environment, whether wired or wireless, and may be applied to any number of such devices connected via a communications network and interacting across the network. Therefore, the disclosed systems as described herein should not be limited to any single example, but rather should be construed in breadth and scope in accordance with the appended claims.

In describing preferred methods, systems, or apparatuses of the subject matter of the present disclosure—in service fade margin measurement—as illustrated in the Figures, specific terminology is employed for the sake of clarity. The claimed subject matter, however, is not intended to be limited to the specific terminology so selected. In addition, the use of the word "or" is generally used inclusively unless otherwise provided herein.

This written description uses examples to enable any person skilled in the art to practice the claimed subject matter, including making and using any devices or systems and performing any incorporated methods. Other variations of the examples are contemplated herein.

Methods, systems, and apparatuses, among other things, as described herein may provide for in-service fade margin measurement. A method, system, computer readable storage medium, or apparatus provides for receiving instructions to test fade margin for a wireless communication link associated with a radio (e.g., base station), wherein the wireless communication link is in a live traffic state; testing the fade margin; in response to the testing, receiving error information, wherein the error information includes information from an error correction mechanism for the wireless communication link; based on the error information, determining that a threshold number of errors has been reached, wherein the threshold number of errors are associated with keeping the performance of the communication link within a minimum threshold performance level; and sending an alert based on the threshold number of errors. All combinations in this paragraph (including the removal or addition of steps) are contemplated in a manner that is consistent with the other portions of the detailed description.

What is claimed:

1. A method comprising:
receiving instructions to test a fade margin for a wireless communication link associated with a receiver radio, wherein the wireless communication link is passing live traffic;
testing the fade margin when the wireless communication link is passing the live traffic;
receiving error information, wherein the error information is based on an error correction mechanism for the wireless communication link;
based on the error information, determining that a threshold number of errors has been reached;
determining a measured received signal level at the receiver radio when the threshold number of errors occurred;
comparing the measured received signal level with an expected received signal level having a same error threshold as the measured received signal level; and
sending an alert based on the threshold number of errors and an indication of a change in the measured received signal level based on the comparing.

2. The method of claim 1, wherein the alert comprises the measured received signal level at the receiver radio when the threshold number of errors occurred.

3. The method of claim 1, wherein the alert comprises the expected received signal level.

4. The method of claim 1, further comprising wherein the error correction mechanism is forward error correction.

5. The method of claim 1, wherein the wireless communication link is a fixed service link.

6. The method of claim 1, wherein the alert comprises a fade margin degradation value.

7. The method of claim 1, wherein the alert comprises an indication of when to cease the testing of the fade margin.

8. A system comprising:
one or more processors; and
memory coupled with the one or more processors, the memory storing executable instructions that when executed by the one or more processors cause the one or more processors to effectuate operations comprising:
receiving instructions to test a fade margin for a wireless communication link associated with a receiver radio, wherein the wireless communication link is passing live traffic;
testing the fade margin when the wireless communication link is passing the live traffic;
receiving error information, wherein the error information is based on an error correction mechanism for the wireless communication link;
based on the error information, determining that a threshold number of errors has been reached;
determining a measured received signal level at the receiver radio when the threshold number of errors occurred;
comparing the measured received signal level with an expected received signal level having a same error threshold as the measured received signal level; and
sending an alert based on the threshold number of errors and an indication of a change in the measured received signal level based on the comparing.

9. The system of claim 8, wherein the alert comprises the measured received signal level at the receiver radio when the threshold number of errors occurred.

10. The system of claim 8, wherein the alert comprises the expected received signal level.

11. The system of claim 8, the operations further comprising wherein the error correction mechanism is forward error correction.

12. The system of claim 8, wherein the wireless communication link is a fixed service link.

13. The system of claim 8, wherein the alert comprises a fade margin degradation value.

14. The system of claim 8, wherein the alert comprises an indication of when to cease the testing of the fade margin.

15. A non-transitory, computer readable storage medium storing computer executable instructions that when executed by a computing device cause said computing device to effectuate operations comprising:
receiving instructions to test a fade margin for a wireless communication link associated with a receiver radio, wherein the wireless communication link is passing live traffic;
testing the fade margin when the wireless communication link is passing the live traffic;
receiving error information, wherein the error information is based on an error correction mechanism for the wireless communication link;
based on the error information, determining that a threshold number of errors has been reached;
determining a measured received signal level at the receiver radio when the threshold number of errors occurred;
comparing the measured received signal level with an expected received signal level with a same error threshold as the measured received signal level; and
sending an alert based on the threshold number of errors and an indication of a change in the measured received signal level based on the comparing.

16. The non-transitory, computer readable storage medium of claim 15, wherein the alert comprises the measured received signal level at the receiver radio when the threshold number of errors occurred.

17. The non-transitory, computer readable storage medium of claim 15, wherein the alert comprises the expected received signal level.

18. The non-transitory, computer readable storage medium of claim 15, the operations further comprising wherein the error correction mechanism is forward error correction.

19. The non-transitory, computer readable storage medium of claim 15, wherein the wireless communication link is a fixed service link.

20. The non-transitory, computer readable storage medium of claim 15, wherein the alert comprises a fade margin degradation value.

* * * * *